(12) United States Patent
Beck

(10) Patent No.: US 7,845,813 B1
(45) Date of Patent: Dec. 7, 2010

(54) POSITIONAL SETTING TOOL FOR USE IN AN OIL SUMP LUBRICATION SYSTEM

(76) Inventor: Lewis H. Beck, 7800 Rochester Hwy., Seneca, SC (US) 29672

( * ) Notice: Subject to any disclaimer, the term of this patent is extended or adjusted under 35 U.S.C. 154(b) by 363 days.

(21) Appl. No.: 11/891,989

(22) Filed: Aug. 14, 2007

(51) Int. Cl.
*F21V 33/00* (2006.01)
*G02B 27/20* (2006.01)

(52) U.S. Cl. .................. 362/101; 362/259; 184/6.4; 184/7.4; 184/108

(58) Field of Classification Search .......... 184/6.4, 184/7.4, 13.1, 96, 103.1, 105.1, 55.1; 73/290 R, 73/291, 293; 285/89; 340/619, 623, 624, 340/618, 450.3; 137/453, 454, 588, 415, 137/614; 362/101; 116/202; 33/263, 285, 33/286
See application file for complete search history.

(56) References Cited

U.S. PATENT DOCUMENTS

| | | | | | |
|---|---|---|---|---|---|
| 1,734,293 | A | * | 11/1929 | Hellweg | 118/234 |
| 3,015,371 | A | * | 1/1962 | Gits | 184/103.2 |
| 3,590,857 | A | * | 7/1971 | Gruett | 137/414 |
| 3,605,086 | A | * | 9/1971 | Triska | 340/450.3 |
| 4,342,376 | A | | 8/1982 | Lyden | 184/103 R |
| 4,409,867 | A | | 10/1983 | Lyden | 81/436 |
| 4,459,584 | A | * | 7/1984 | Clarkson | 340/624 |
| 4,895,222 | A | * | 1/1990 | Hoffmann | 184/103.1 |
| 5,878,842 | A | | 3/1999 | Rake | 184/6.4 |
| 6,098,297 | A | | 8/2000 | Belfiore | 33/286 |
| 6,374,507 | B1 | | 4/2002 | Lehto | 33/645 |
| 6,447,573 | B1 | | 9/2002 | Rake | 95/10 |
| 6,532,676 | B2 | | 3/2003 | Cunningham | 33/286 |
| 6,796,040 | B2 | | 9/2004 | Ohtomo et al. | 33/286 |
| 6,804,893 | B2 | | 10/2004 | Watson et al. | 33/290 |
| 6,932,856 | B2 | | 8/2005 | Rake | 95/10 |
| 7,017,712 | B1 | | 3/2006 | Rake et al. | 184/6.4 |

(Continued)

FOREIGN PATENT DOCUMENTS

GB 2423364 A 8/2006

(Continued)

OTHER PUBLICATIONS

*Glass, LS, or SS Opto-Matic Oilers*, Installation Instructions, TRICO MFG. CORP., Pewaukee, WI, 53072, www.tricomfg.com.

(Continued)

*Primary Examiner*—Robert A Siconolfi
*Assistant Examiner*—San Aung
(74) *Attorney, Agent, or Firm*—Stephen R. Chapman

(57) ABSTRACT

A tool for use in a lubrication system having an oil-containing sump for supplying lubricating oil to a mechanical device and an oiler device connected to the sump for delivering a supply of oil to the sump, the oiler device comprising a base for supporting an oil reservoir and an adjustable element movably disposed within the base for predetermining a level of oil to be maintained within the sump. The tool has a first portion configured to extend into the base for engagement with the adjustable element and a second portion disposed exteriorly of the base to visually indicate the disposition of the adjustable element relative to the oil-containing sump, preferably in the form of a pointing device, optimally a laser beam generating instrument, for representing the disposition of the adjustable element.

1 Claim, 2 Drawing Sheets

U.S. PATENT DOCUMENTS

| | | | | |
|---|---|---|---|---|
| 7,100,293 | B2 | 9/2006 | Kahle | 33/290 |
| 7,140,468 | B2 | 11/2006 | Rake et al. | 184/6.23 |
| 7,306,525 | B2 * | 12/2007 | Sawada | 473/212 |
| 2006/0016083 | A1 * | 1/2006 | Huang | 33/286 |

FOREIGN PATENT DOCUMENTS

| | | |
|---|---|---|
| WO | WO 82/04316 | 12/1982 |

OTHER PUBLICATIONS

*TRICO Technical Bulletin, Preventing Excessive Lubrication in Oil Sump Applications*, www.tricocorp.com, 2 pages.

*Effective Constant Level Lubrication* by Brad Rake, Machinery Lubrication, May-Jun. 2002, 4 pages.

Drawing, *Simple Device for Measuring Trico Oiler Crossbar Height*, Jim Tipton FPLE Seabrook.

\* cited by examiner

POSITIONAL SETTING TOOL FOR USE IN AN OIL SUMP LUBRICATION SYSTEM

BACKGROUND OF THE INVENTION

The present invention relates generally to systems and devices for lubricating mechanical equipment and, more particularly, to devices used for setting and maintaining a supply of lubricating oil to a sump associated with the mechanical equipment being lubricated.

The use of an oil sump to provide a supply of lubricating oil is a common means of lubrication selected by machine designers to lubricate various types of industrial equipment, such as pumps, blowers, gear boxes, drives and compressors. The provision of an oil sump offers the advantages of a simple and low-cost design which, if properly attended, can be operated with commensurately low maintenance costs and low risk of component failure.

A critical requirement to the efficacy of an oil sump is the proper maintenance of the oil level in the sump. Depending on the item of equipment to which the sump provides lubrication, it may be necessary that the oil level be maintained within a relatively narrow range to assure sufficient lubrication without overfilling of the sump. Generally speaking, the smaller the sump and attendant quantity of the oil supplied in the sump, the more narrow will be the range of acceptable oil levels.

It is widely recognized that oil in a sump or any other enclosed lubrication system will be gradually lost due to leakage and other factors, thereby necessitating some means for replenishing the oil supply at least periodically. In oil lubricating systems, the most common means of maintaining a generally constant lubricant level in the sump is to attach a so-called constant level oiler device to the sump to provide a continuously available excess quantity of oil fed gravitationally through the oiler into the sump as its oil level depletes. Various types of constant level oilers are known in the industry, including both adjustable and non-adjustable types. The present invention relates specifically to adjustable-type constant level oilers.

Basically, adjustable constant level oilers provide an enclosed reservoir which contains a quantity of oil for delivery, as needed, to the associated sump. The reservoir rests on an adjustable element within a supporting base connected to the sump. Adjusting of the element supporting the reservoir varies the elevation of the reservoir relative to the sump and thereby varies the gravitational flow of the oil to the sump to, in turn, determine the equilibrium level of oil maintained in the sump. Hence, the careful setting of the position of the adjusting element in the initial setup of the constant level oiler is critical to maintaining a proper desirable level of oil within the sump.

While this lubrication system utilizing a constant level oiler to supply an oil sump is simple in design and operation, it has been discovered through an empirical sampling that a surprising proportion of constant level oilers in actual operation are improperly set so as to maintain either too high or too low of an oil level within the associated pump. In either case, the end result is that the associated mechanical component will generate excessive heat, causing early degradation of the oil supply and shortening the life of the mechanical device.

While various factors may contribute to inaccurate settings of constant level oilers, one significant problem is believed to be the necessity with conventional oilers that the adjustable element be set manually through a trial and error process. The adjustable element resides within a base which supports the oiler, whereby its elevational position within the oiler base can only be set visually from a downward view into the base, which impairs the ability of a technician to carefully sight the level of the adjustable element in relation to the associated sump. Hence, one manufacturer's installation instructions provide for the initial setting of the adjustable element, placement of the oil reservoir and operation of the equipment to check the actual prevailing lubrication level in the sump, followed by repeating the process one or more times if the oil level in the sump is too high or too low.

A need accordingly exists within the relevant industry for an improved means of setting up a constant level oiler which would be simplified and easier to accomplish than conventional set-up techniques yet would also provide greater precision and reliability to the setting of the desired oil level.

SUMMARY OF THE INVENTION

The present invention proposes to satisfy this recognized need basically by providing a unique tool by which the positional setting of the adjustable element within the base of the constant level oiler is indicated visually from the exterior of the constant level oiler for more precise adjustment relative to the associated oil sump.

More specifically, the tool of the present invention provides a first portion configured to extend into the base of the constant level oiler and into engagement with the adjustable element, and a second portion disposed exteriorly of the base and including a pointing device to visually indicate the disposition of the adjustable element relative to the oil-containing sump. Thus, as the elevation of the adjustable element of the oiler is moved upwardly and downwardly during the set-up process, the pointing device of the present tool provides a visual reference at each step in the adjustment process to sight the position of the adjustable element relative to the oil sump from exteriorly of the oiler, thereby greatly improving the ability of the technician to more precisely set the position of the adjustable element.

In a preferred embodiment, the pointing device on the second portion of the tool is most optimally in the form of a laser beam generating instrument, to represent most precisely the disposition of the adjustable element. It is contemplated to be desirable that a marking be made or provided on the exterior of the sump precisely at the most desirable elevation of the oil level therein. In turn, the laser beam or other pointing device points toward or shines against the sump as the position of the adjustable element is calibrated, thereby to ensure the most precise positioning of the element in relation to the sump.

It is further preferred that the first and second portions of the tool be rigidly fixed with respect to one another. For example, the tool may be configured as a unitary body in an inverted U-shape having a first depending leg forming the first portion, a second depending leg generally parallel to the first leg forming the second portion, and a bridge portion connecting the first and second legs in spaced parallel relation. In use, therefore, the tool is fitted onto the base of the oiler with the first leg extending downwardly alongside an interior side of the base into engagement with the adjustable element, with the second leg extending downwardly alongside an exterior side of the base, and with the bridge portion disposed across an upwardly facing edge of the base. A positioning element such as an adjusting screw may be threadedly supported on the bridge portion of the tool for adjusting the elevational disposition of the tool relative to the base so as to position the first depending leg of the tool in contact with the adjustable element without placing unnecessary weight or force against the element.

DETAILED DESCRIPTION OF THE PREFERRED EMBODIMENT

Figure 1:
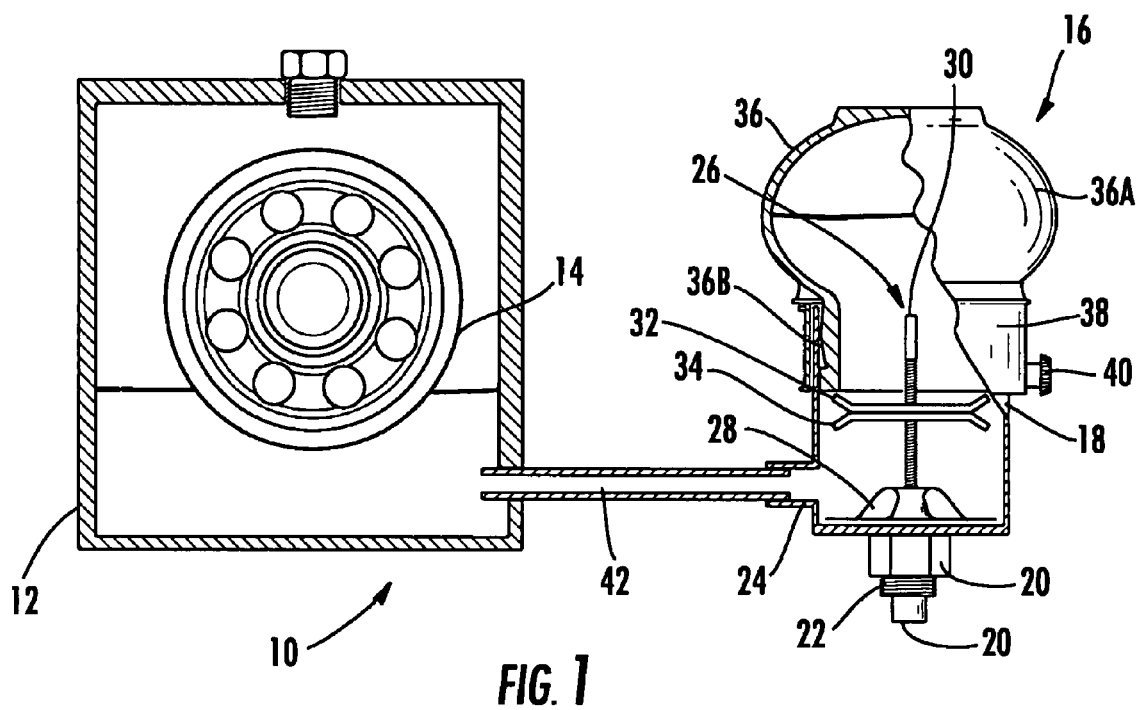
FIG. 1 is a schematic view, partly in side elevation and partly in vertical cross-section, depicting a conventional lubrication system having a constant level oiler for controlling the oil level in an associated mechanical oil sump for a mechanical device depicted only representatively as a bearing shaft.

With reference now to the accompanying drawings and initially to FIG. 1, a conventional oil sump lubrication system, indicated generally in its totality at 10, is shown schematically in partial side elevation and partial vertical cross-section. The lubrication system 10 basically comprises an oil-containing sump 12, indicated only representatively, which partially contains a quantity of lubricating oil and also in which is disposed a mechanical device partially submerged within the quantity of contained oil for lubrication. The mechanical device is indicated for illustrative purposes as a simplified form of ball bearing assembly 14, but as those persons skilled in the art will recognize, the mechanical device could be a pump, blower, gearbox, drive, compressor or any other form of mechanical component requiring lubrication. In turn, the configuration of the sump would be designed in relation to the mechanical device and, hence, it is to be understood that the depiction of the arrangement of the sump and the mechanical device are merely schematic for purposes of illustrating the environment relevant to the present invention.

The lubrication system 10 further includes a constant level oiler device, generally indicated at 16, which is connected to the sump 12 to provide a replenishing supply of oil to the sump as the quantity of oil contained in the sump is gradually expended. For purposes of illustration and description of the present invention, the constant level oiler device 16 is shown as being an "Opto-Matic" model of constant level oiler manufactured by Trico Manufacturing Corp., of Pewaukee, Wis., although it is to be understood that the present invention is not limited to use with this particular model or manufacturer of constant level oiler, but instead has a broader and more generalized application for use with other forms of adjustable-type constant level oilers.

The constant level oiler device 16 basically comprises a hollow cup-shaped base 18 open at its upper end and formed with threaded ports 22, 24 at its bottom end and on one side surface for selective connection to an oil delivery conduit. The base 18 contains an oil level adjustment assembly 26 having a foot portion 28 supporting an upright threaded bolt extending centrally through the base 18. Upper and lower adjuster arms 32, 34, each in the form generally of a wing-type nut, are threadedly supported on the upright bolt 30 for rotational movement upwardly and downwardly therealong for purposes more fully described hereinafter.

The constant level oiler device 16 further includes an oil reservoir 36 having a generally spherical globe 36A merging downwardly into a generally cylindrical collar 36B. The oil reservoir 36 is hollow and opens downwardly through the lower rim of the collar 36B, which rests on the upwardly facing surface of the uppermost adjuster arm 32. A cylindrical skirt 38 annularly surrounds the collar portion 36B of the oil reservoir 36 at a slight annular spacing therefrom and is sealed to the oil reservoir 36 adjacent the juncture between the globe 36A and the collar 36B. In this manner, the assembly of the oil reservoir 36 and the skirt 38 may be situated on the base 18 with the collar portion 36B extending interiorly within the base 18 into resting engagement on the upper adjuster arm 32 and with the skirt 38 outwardly encircling the base 18. The skirt 38 may be equipped with a set screw 40 to secure the oil reservoir assembly in place rigidly relative to the base 18.

In operation, the base 18 is connected via either of the ports 22, 24 to an appropriate pipe or conduit, indicated only schematically at 42, which in turn is connected to an oil entrance port formed in the sump 12. The port 22 or 24 of the base 18 which is not actively connected to the conduit 42 is closed via a threaded plug. FIG. 1 depicts merely for illustrative purposes a so-called side-mounted connection between the constant level oiler device 16 and the sump 12, wherein the side port 24 of the oiler device 16 is connected laterally with a similar side port in the sump 12, but those persons skilled in the art will also recognize that a so-called bottom-mounted connection between the bottom port 22 of the oiler device 16 and a bottom port in the sump 12 may be utilized.

In basic set-up for operation, the oil reservoir 36 is initially filled with oil and inverted into assembly, as above-described, onto the base 18, whereby the oil gravitationally fills the base 18, the collar portion 36B and a portion of the globe portion 36A of the oil reservoir 36. The elevation of the upper adjuster arm 32 determines the elevation of the oil reservoir 36 and, in turn, determines the equilibrium level to which the oil fills the bottom of the sump 12. Thus, prior to set-up, the upper adjuster arm 32 is threadedly moved manually along the upstanding bolt 30 into a disposition at an elevation as close as possible to the desired level of oil within the sump 12. The lower adjuster arm 34 is threadedly moved along the bolt upwardly into abutment with the underside of the upper adjuster arm 32 as a means of locking the upper adjuster arm 32 in its adjusted disposition.

One of the difficulties in this conventional set-up procedure is the inability of the technician to accurately set the elevation of the upper adjuster arm 32 in relation to the desired oil level within the sump 12, because of the inability of the technician to view the interior of the sump 12 and also to view laterally the interior of the base 18 of the constant level oiler device 16. It is conventional to place a marking on the exterior housing surface of the sump 12 visually indicating the desired interior oil level to be maintained within the sump 12, and the technician is able to view downwardly into the interior of the base 18 of the constant level oiler device 16, but it is difficult for the technician to accurately sight laterally or horizontally the elevation of the adjuster arm 32 against the exterior level marking on the sump 12. Hence, as noted above, Trico Manufacturing Corporation, the maker of the "Opto-Matic" model oiler device recommends the trial-and-error procedure discussed above in initially setting up the oiler and also each time the oiler must subsequently be refilled with a supply of oil. Unfortunately, however, technicians do not always properly follow this procedure and, moreover, it still remains difficult to precisely set the elevation of the upper adjuster arm 32.

Figure 2:
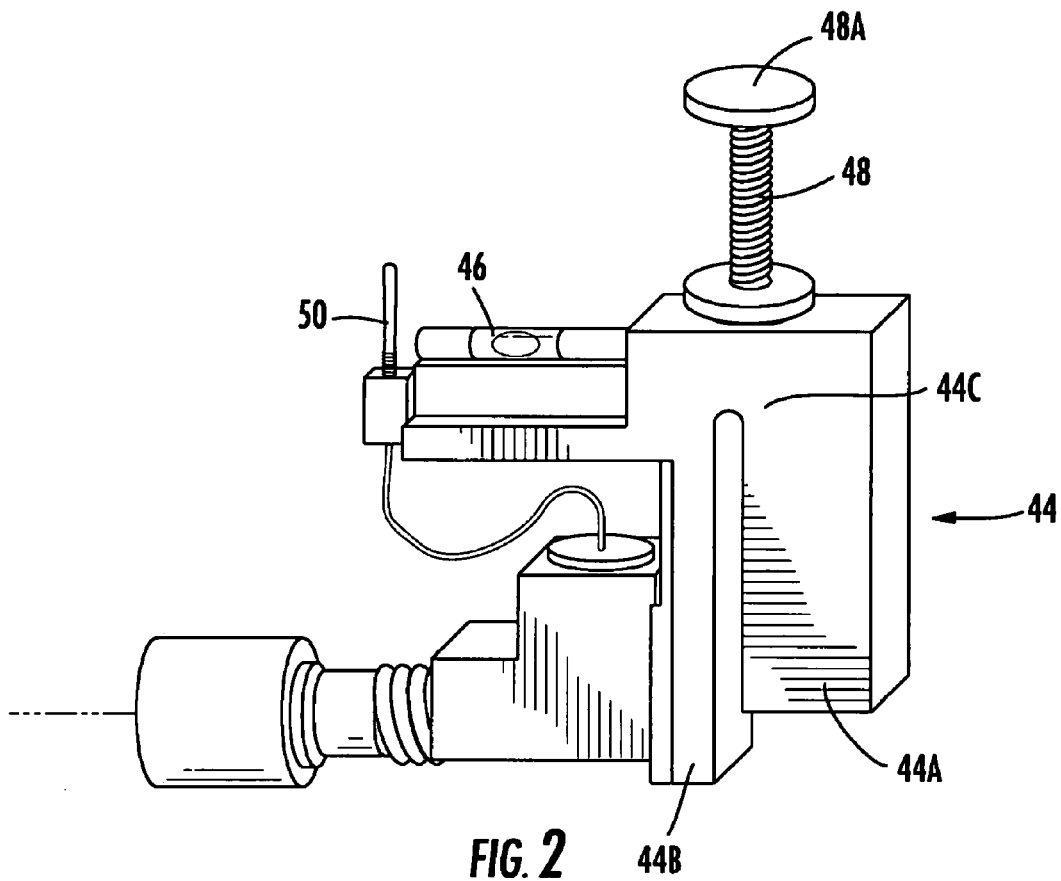
FIG. 2 is a perspective view depicting a preferred embodiment of the tool of the present invention.
Figure 3:
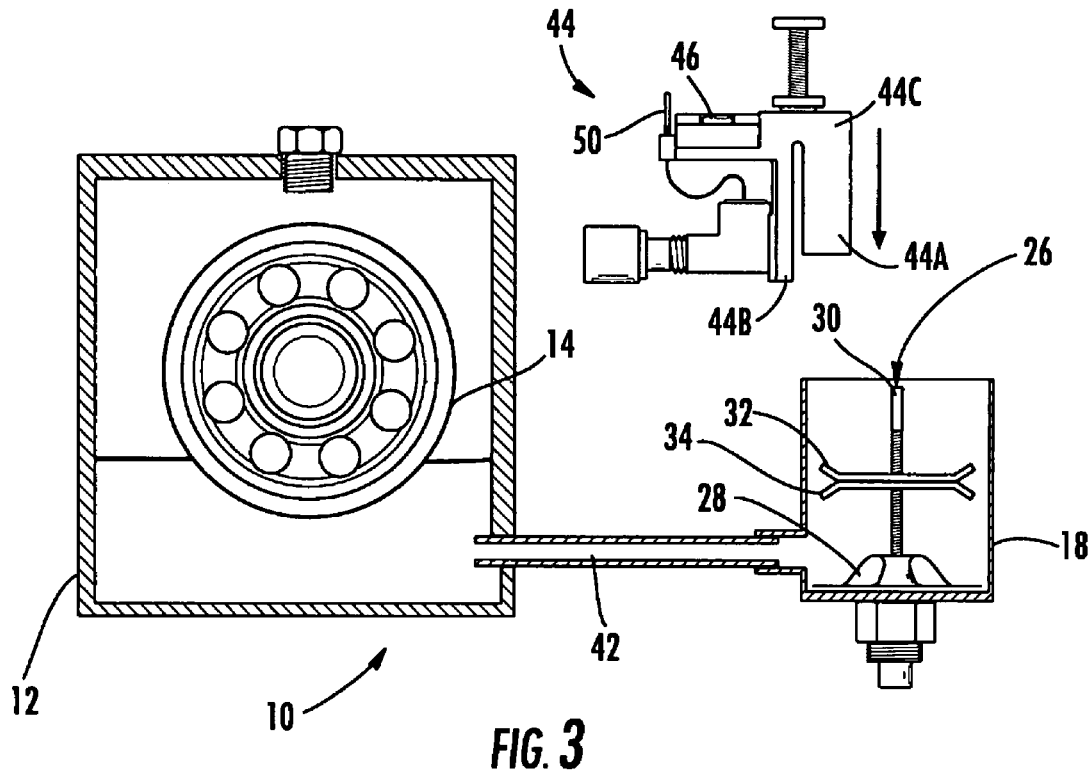
FIGS. 3 and 4 are views of the lubrication system of FIG. 1, but depicting sequential steps in the use of the present tool for setting the oil level within the sump via adjustment of the adjusting element of the constant level oiler.
Figure 4:
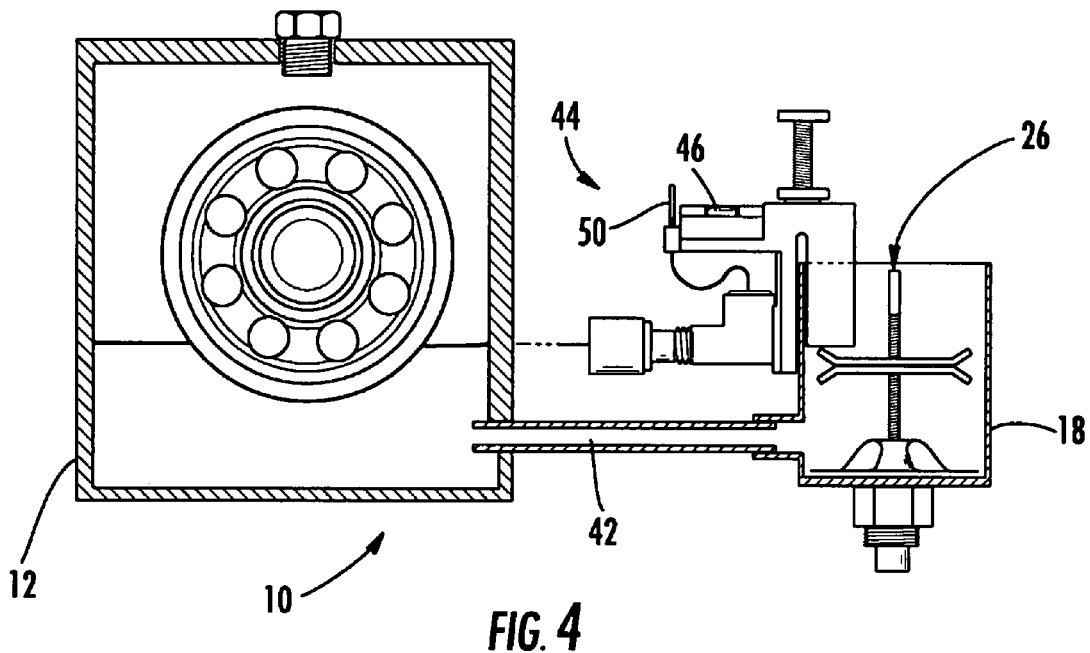

Accordingly, the present invention provides a novel position setting tool, as indicated generally at 44 in FIG. 2. Basically, the tool 44 is configured to be used during set-up of the constant level oiler device 16, when the assembly of the oil reservoir 36 and the skirt 38 have been removed from the base 18, as depicted in FIGS. 3 and 4. The tool 44 may be of differing configurations, but fundamentally is configured to be placed about the upper rim of the base 18 with one portion of the tool 44 extending interiorly within the base 18 into engagement with the upper adjuster arm 32 and with another portion of the tool 44 situated exteriorly of the base 18 at precisely the same elevation as the interior portion engages the adjuster arm 32, thereby to visually provide a precise reference to the elevation of the adjuster arm 32 to enable the technician to accurately sight in relation to the exterior marking on the sump 12.

In FIG. 2, a preferred embodiment of the tool 44 is depicted as being a unitary body formed in an inverted U-shaped configuration with two parallel leg portions 44A, 44B, depending from a connecting bridge portion 44C. In this manner, the tool 44 may be disposed on the rim of the base 18 with the leg portion 44A extending downwardly into the interior of the base 18 and the leg portion 44 extending downwardly alongside the exterior of the base 18, with the bridge portion 44C overlying the upper rim of the base 18. An adjusting screw 48 extends downwardly through the bridge portion 44C in parallel relation to the inner and outer legs 44A, 44B, such that the lower end of the adjusting screw 48 rests in direct contact with the upper rim of the base 18. The adjusting screw 48 includes a thumbwheel portion 48A is integral with the opposite upper end of the adjusting screw 48 for adjustably extending or withdrawing the adjusting screw into or out of the spacing between the inner and outer legs 44A, 44B, thereby to enable the elevation of the tool 44 relative to the base 18 to be adjusted and also to assist in stabilizing the resting disposition of the tool 44 once its elevation is adjusted. By extension and withdrawal of the adjusting screw 48 via the thumbwheel 48A, the tool is rested on the base 18 at precisely the elevation at which the inner leg 44A contacts the upper adjuster arm 32. In turn, the outer leg 44B of the tool 44 provides an external visual reference to the elevation of the upper adjuster arm 32 within the interior of the base 18, e.g., by the formation of the lower edge of the outer leg 44B to be disposed at precisely the same elevation at the exterior of the base 18 as the inner leg 44A or the outer leg 44B may carry a visual reference marking at precisely such elevation. The tool 44 may be provided with a leveling means, such as a bubble type level device 46, to insure that the inner and outer legs are correctly oriented vertically. A lock nut 47 may be provided on the shaft of the adjusting screw 48 to secure the adjusting screw in place once its disposition has been precisely set, thereby to assure that the elevation and level of the tool is maintained.

Optimally, the tool 44 may be equipped with some form of pointing device at the lower end of the outer leg 44B as a supplementary visual reference to the technician. In the preferred embodiment illustrated, a laser beam generating instrument, shown only schematically at 50, may be utilized as a pointing device on the outer leg 44B so as to be shone directly horizontally against the exterior of the sump 12, thereby to provide the most precise visual indication when the adjuster arm 32 and, in turn, the tool 44 is adjusted to precisely the same elevation as the desired level of oil within the sump 12. The tool 44 may have a switch, such as represented at 52, to enable selective actuation and deactuation of the laser beam instrument or other pointing device 50 when needed as a sighting reference. However, it is to be understood that the provision of such a pointing device is not a necessary element of the present tool, as the outer leg 44B itself provides a reliable visual reference to sight against the marking on the exterior of the sump 12.

The advantages of the present positioning tool will be readily apparent to those persons skilled in the art. Utilizing the present tool 44, it will not longer be necessary for any technician to perform any repetitive trial-and-error process in setting up the constant level oiler device 16. Instead, the tool 44 will enable technicians to make a precise setting of the elevation of the upper adjuster arm 32 before the oil reservoir 36 is filled with oil and inverted onto the base 18, without concern for having to repeat the process to ensure the proper oil level is achieved within the sump. Minimal or no skill or experience is needed on the part of the technician to perform a proper set-up of the constant level oiler 16. Further, the overall time required for set-up will be significantly shortened. Most importantly, however, the more reliable maintenance of proper oil levels for lubricating the associated mechanical device will optimize the useful life of the device as well as the useful life of the lubricating oil.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A positional setting tool comprising:
a unitary body formed in an inverted U-shaped configuration, wherein said unitary body is adapted to being positioned on the base of a constant level oiler device; said unitary body further comprising an inner leg portion and an outer leg portion, wherein said inner leg portion and said outer leg portion descend downwardly in parallel relationship from a connecting bridge portion and further wherein said inner leg portion is shorter than said outer leg portion, and still further wherein said inner portion leg and said outer leg portion are fixed rigidly with respect to each other; said positional setting tool further comprises an adjusting screw, wherein said adjusting screw descends downwardly, through said connecting bridge portion and further wherein said adjusting screw is adapted to functionally engage the edge of said constant oiler device; further, said inner leg is adapted to functionally contact the vertically adjustable, upper adjustment arm of said constant level oiler device; and further wherein said positional setting tool comprises a laser beam generating device and a leveling means wherein said laser beam generating device is structurally connected to the bottom of said outer leg and positioned such that the laser beam is projected directly, horizontally against the sump of an oil sump lubricating system and said leveling device is connected to said unitary body and positioned with respect to said laser generating device so as to ensure that the beam generated by said laser device provides proper horizontal orientation of said inner and said outer leg portions.

* * * * *